(12) United States Patent
Akcasu et al.

(10) Patent No.: US 8,774,752 B1
(45) Date of Patent: Jul. 8, 2014

(54) METHOD FOR EMERGENCY ALERT USING SMS TEXT

(71) Applicant: Lonestar Inventions, L.P., Morgan Hill, CA (US)

(72) Inventors: Osman Ersed Akcasu, Morgan Hill, CA (US); Ibrahim Akcay, Istanbul (TR)

(73) Assignee: Lonestar Inventions, L.P., Morgan Hill, CA (US)

( * ) Notice: Subject to any disclaimer, the term of this patent is extended or adjusted under 35 U.S.C. 154(b) by 0 days.

(21) Appl. No.: 13/705,708

(22) Filed: Dec. 5, 2012

Related U.S. Application Data

(60) Provisional application No. 61/570,580, filed on Dec. 14, 2011.

(51) Int. Cl.
| | |
|---|---|
| *H04M 11/04* | (2006.01) |
| *H04W 4/02* | (2009.01) |
| *H04W 4/12* | (2009.01) |
| H04W 64/00 | (2009.01) |

(52) U.S. Cl.
CPC ........ *H04W 4/02* (2013.01); *H04W 4/12* (2013.01); H04W 64/00 (2013.01)
USPC ................. 455/404.1; 455/404.2; 455/466

(58) Field of Classification Search
CPC ........... H04W 4/02; H04W 4/12; H04W 4/22; H04W 64/00
USPC .................. 455/404.1, 404.2, 466
See application file for complete search history.

(56) References Cited

U.S. PATENT DOCUMENTS

| | | | |
|---|---|---|---|
| 2008/0045250 A1* | 2/2008 | Hwang | 455/466 |
| 2008/0081646 A1* | 4/2008 | Morin et al. | 455/466 |
| 2008/0227430 A1* | 9/2008 | Polk | 455/404.2 |
| 2010/0075628 A1* | 3/2010 | Ye | 455/404.2 |
| 2011/0217947 A1* | 9/2011 | Czaja et al. | 455/404.1 |
| 2012/0252420 A1* | 10/2012 | Czaja et al. | 455/414.1 |
| 2012/0282887 A1* | 11/2012 | Khoo et al. | 455/404.2 |
| 2013/0109342 A1* | 5/2013 | Welch | 455/404.2 |
| 2013/0295883 A1* | 11/2013 | Wesby-van Swaay | 455/411 |
| 2013/0344841 A1* | 12/2013 | Daly | 455/404.1 |

* cited by examiner

*Primary Examiner* — Jean Gelin
(74) *Attorney, Agent, or Firm* — Kilpatrick Townsend & Stockton LLP; Kenneth R. Allen

(57) ABSTRACT

A method uses a smart phone having SMS text and location (GPS) capability for automatically generating messages and contacting emergency services through SMS messaging capability rather a verbal communication along with the vital information related to the caller in an emergency situation. The emergency response center uses the information to parse standardized emergency SMS messages to quickly yield critical information related to the number, priority and the geographical distribution of the emergency cases for planning of the most efficient response with available resources. The data and prioritizing may take into account time of day or night by position of the sun and moon relative to current location of the smart phone.

11 Claims, 2 Drawing Sheets

METHOD FOR EMERGENCY ALERT USING SMS TEXT

CROSS-REFERENCES TO RELATED APPLICATIONS

The present application claims benefit under 35 USC 119(e) of U.S. provisional Application No. 61/570,580, filed on Dec. 14, 2011, entitled "Method for Emergency Alert Using SMS Text," the content of which is incorporated herein by reference in its entirety.

STATEMENT AS TO RIGHTS TO INVENTIONS MADE UNDER FEDERALLY SPONSORED RESEARCH AND DEVELOPMENT

NOT APPLICABLE

REFERENCE TO A "SEQUENCE LISTING," A TABLE, OR A COMPUTER PROGRAM LISTING APPENDIX SUBMITTED ON A COMPACT DISK

NOT APPLICABLE

BACKGROUND OF THE INVENTION

This invention relates to use of cellular telephone texting capabilities for alerting emergency services. More particularly, this invention provides a technique for contacting emergency services using SMS communication services. This invention is related to setting up the required protocols.

Having an easy-to-remember, simple and short telephone number such as 911 to report an emergency situation, is a proven idea. It allows anyone in an emergency situation, anywhere to call a commonly known number (911 in the USA) to report the emergency situation without having to find a directory and looking up a local number. According to established procedure, after receiving such a call, the 911 operator asks several questions of the person making the call, and emergency response units are sent to the scene based on phone location and other gathered information to address the emergency. This process requires a verbal dialog between the person making the call and the 911 operator which can last several minutes, during which time precious time may be lost. One of the most difficult questions to answer in that verbal dialog is "Where are you"? In massive disasters such as the Japanese Earthquake and Tsunami disaster of 2011, there can be very large numbers of victims that will inevitably result in very large number of simultaneous 911 calls, and lines can be quickly overloaded. Dealing verbally with such a large number of simultaneous calls is very difficult in the first place. There will be need of very large number of 911 lines and operators to respond to the calls. On top of that most of the callers won't even know where they are in the first place! Coordinating a rescue plan in such a large scale disaster requires some quick evaluation on the distribution of the cases which is very difficult to prepare with the standard 911 reporting procedures!

A smart phone has texting or SMS capabilities and also typically has a GPS feature. This feature can be used to implement a location reporting function. An emergency alert system that is a text-based emergency reporting system is not known to exist today.

A smart phone equipped with location information capability, such as GPS capability, can share its current location coordinates as part of a "Here I am" mode. This option is a quick way of finding a lost person, a misplaced phone or simply for curiosity purposes. Sending the GPS coordinates with a touch of a button and displaying it on the receiving party's smart phone display or other device with messaging and display capability is an easy alternative to very imprecise verbal means of explaining a present location!

Currently there is no known operational telephone number where an "Emergency SMS" message can be sent. With increasing large natural disaster occurrences the need is increasing and since the technology to do it is available it is wise to provide such a number. It is almost certain in the near future such a service will be available besides the time-consuming 911 type emergency reporting numbers.

SUMMARY

According to the invention a method uses a smart phone having SMS text and location information capability for automatically generating messages with location and time of day display information and for contacting emergency services through SMS messaging capability rather a verbal communication along with the vital information related to the caller in an emergency situation. The location information may be derived from GPS signals for accuracy. Preprogrammed and situational information, as well as location information may be communicated promptly to an emergency SMS phone number. The number need not be local to the caller but could be connected with a regional or local emergency response center. An emergency response center uses the information to parse standardized emergency SMS messages to quickly yield critical information related to the number, priority and the geographical distribution of the emergency cases for planning of the most efficient response with available resources. The data and prioritizing may take into account time of day or night by position of the sun and moon relative to current location of the smart phone. As a result, this invention gives an automatic, touch of a button SMS alternative of a typical 911 call to report an emergency.

The invention will better understood by reference to the following detailed description and accompanying drawings.

DETAILED DESCRIPTION OF THE INVENTION

Figure 1:
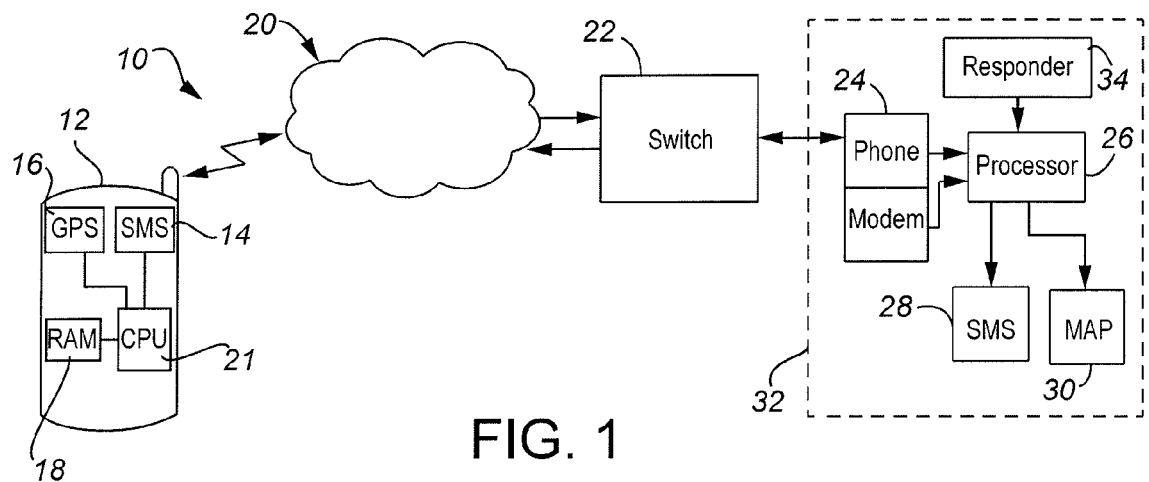
FIG. 1 is a diagram of an emergency SMS network.

The concept of an emergency SMS response system 10 as shown in FIG. 1 requires a user phone 12 with SMS 14 and location information or GPS 16 options, along with appropriate memory 18 and processor or CPU 21, a wirelessly accessible network 20 with switching capability 22, as well as an emergency phone number and a phone or modem 24 with SMS text receiving capability 28 and map display capability 30 at a dispatching facility 32 or clearinghouse that has a facility 34 that is assigned to respond when a call is placed to the called number.

Figure 2:
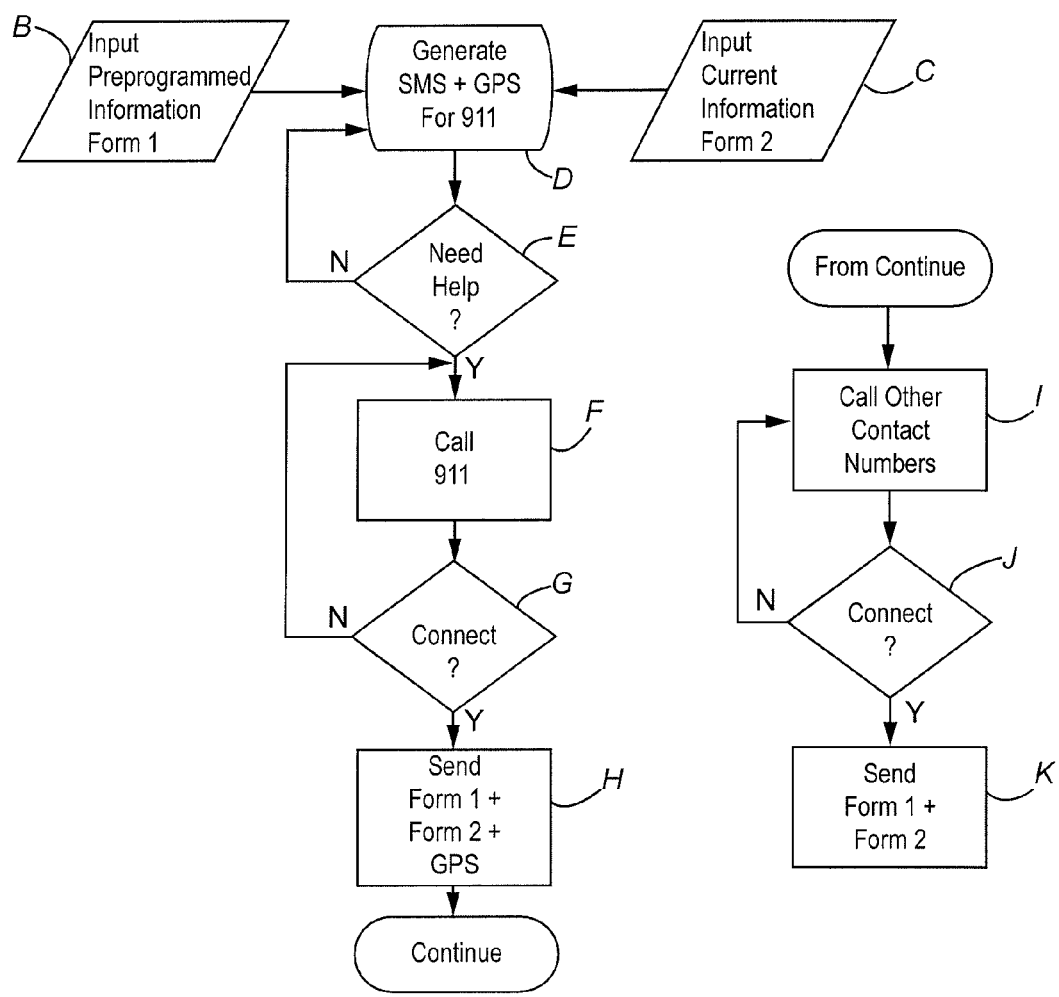
FIG. 2 is a flow chart of an emergency SMS protocol.

Referring to FIG. 2, the calling user must first have preprogrammed a smart phone to contain standard information so it can make the call automatically. Specific steps of FIG. 2 are set forth as follows:
providing a first form for entering personal information in a preprogrammed SMS message format to a smart phone with SMS capability and preferably GPS capability (Step B);

providing a second form for entering current situational information associated with an emergency in the preprogrammed SMS message format in the smart phone (Step C);

providing to the smart phone a preprogrammed emergency SMS calling number for an emergency dispatcher (Step D); thereafter upon occurrence of an occasion to summon aid (Step E), causing the preprogrammed emergency SMS calling number to be called from the smart phone (Step F);

upon connecting with the emergency SMS calling number (Step G), causing the smart phone to automatically send the first form and the second form together with GPS information (Step H).

As an option, further:

prior to calling, providing to the smart phone a preprogrammed list of emergency contact SMS calling numbers; thereafter upon the occurrence of the occasion, causing the smart phone to call the preprogrammed list (Step I); and upon each connection (Step J); causing the smart phone to communicate at least said first form and said second form to the connection (Step K).

Figure 3:
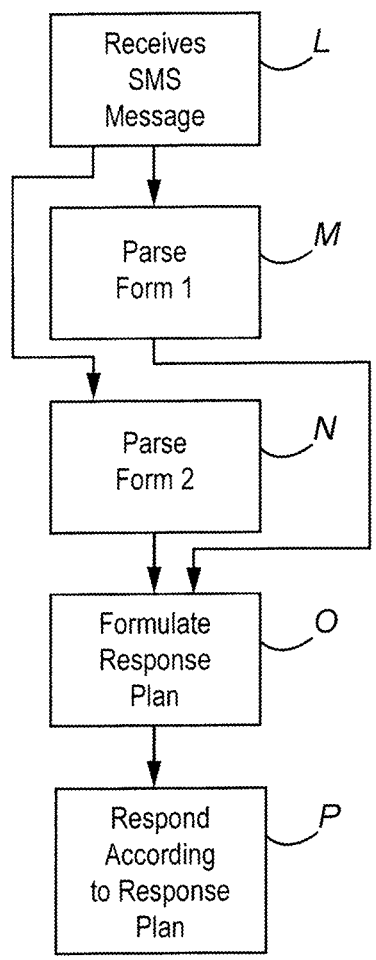
FIG. 3 is a flow chart of a responder protocol.

Referring to FIG. 3, at the receiving end upon message receipt (Step L), parsing the first form (Step M)

and parsing the second form (Step N) into a data set, including data suitable for display about location, time of day, position of the sun and the moon, sunrise, sunset, moonrise, moonset and the like, as explained below;

formulating a response plan to the data set, if not already formulated based on the input (Step O); and causing a response in accordance with the response plan (Step P).

The call is made with the touch of a button or screen icon. Since the call will be made automatically and can be preprogrammed into the calling phone, the called number does not need to be a simple number like 911. To handle large numbers of calls simultaneously a multiple number of lines must be employed.

Once the SMS text message related to a caller's location is received, the receiving user can display the received GPS coordinates on the map at the time that it was sent, along with position of the sun and moon and times of sunset, moonrise, etc. The user can perform the map functions like zoom and move to be "virtually" at that location with the sending party. The displayed view is basically the reconstruction of the sender's position on the map at the time and place where and when the SMS was sent!

A navigation application called SolarTimer™ from OEA International (available through the smart phone app stores) is preferably integrated with this emergency SMS receive and transmit capability and uses its capability of displaying the sun and moon's elevation and azimuth angle with the "OEA compass dial and display" superimposed on the displayed map. This is done by employing the OEA application's astronomical and navigational functions, available from OEA International, which in the preferred embodiment yield less than 0.003 degrees of error in predicting sun and moon elevation and azimuth angles at any location and date and time on earth. This mode of displaying any GPS coordinate is the default display feature of the SolarTimer navigation application. While other navigation applications may be suitable, the accuracy of the OEA functions is believed to be superior and such functions are therefore preferred.

Many rescue operations require the knowledge of day light or moon's state, their orientation to the victim, and remaining daylight or darkness for an effective and successful rescue attempt. Information is made readily available about the transmitting and receiving parties of the present invention in a very easy-to-grasp and relevant display with the knowledge of the current and the time, date and the location of the emergency SMS broadcast. This kind of information is also very useful for prioritizing the rescue operations. In other words it is irrelevant where the emergency SMS messages might have been received. They could be received by a party at any location on earth at any time zone. When the message is displayed on the screen according to the invention it will show the sun and moon location and related additional information for current date and time and the date and the time when the emergency SMS was broadcast. The features of the SolarTimer navigation application and the features of the OEA functions are described in U.S. patent application Ser. No. 13/665,465 filed Oct. 31, 2012 and in Provisional Patent Application Ser. No. 61/557,576 filed Nov. 9, 2011, which are incorporated herein by reference for all purposes.

A very important and potentially life-saving application of this capability is in the event of major disasters such as earthquake, fire, flood, hazmat, hurricane, earthquake, tsunami, accident or medical emergency. As long as the cell phone network is operational this is a very quick and effective means of reporting any kind of emergency situation. The Emergency SMS system can include automatic classification and prioritizing of calls made and calls received. The only thing that the calling user in danger or witnessing an emergency situation then has to do is press one button or screen icon (from a menu) related to the type of emergency that that is occurring, such as accident, fire, crime or medical. When received this message is then sorted and classified by type as an "Emergency SMS" to a selected user-list along with selected "Emergency Contacts" and emergency response units required. The message system may include dispatcher intervention protocols to minimize false alarms.

The information that is contained in the contemplated sent "Emergency SMS" for a personal medical emergency is the phone number, name of the person, type of emergency, his brief medical history, GPS coordinates, altitude, age and gender. As can be seen all the information that is relayed is necessary information for the first responder units and are currently asked questions in a regular 911 call.

The SMS text is prepared in a standardized form in advance, except for the current emergency situation. Thus the received data is in a standardized text format that can be parsed by a computer program and can be directed automatically to emergency response units. Since the time required to parse the received text is very short, this becomes a very significant advantage in the cases of a massive disasters when there can be very large number of simultaneous emergency calls which a "manned" 911 emergency system cannot absorb and respond. This of course presumes that the reporter does not require interactive advice or if so that it can be triaged efficiently. In the case of very large number of simultaneous "Emergency SMS" messages, a response strategy can be set automatically as well. An example is mapping the "Emergency SMS" locations and grouping them based on their nature and setting their location distribution such that most efficient coordinated response can be made with available and always limited emergency response resources. Keeping the statistics of the "Emergency SMS" is also very helpful to prepare future response strategies.

To prevent accidental usage of this feature it is embedded in the "Tracking" function. To make it easy on the receiving emergency response units, a suitable format with sample information might be as follows:

Name: Osman Ersed Akcasu

Age: 56

Blood Group: 0RH+

Special Health Conditions: Diabetic and on high blood pressure medication
Prescriptions: GlipizideXL 10 mg, Glucophage XR 1,000 mg, two times a day, Lisinopril 10 mg
Doctor Contact Smith 408-555-1212
Weight: 163 lb/74 kg
Height: 1.72 m, 5 feet 3 inches
Gender: male
Address: 155 East Main Avenue, Mytown, Calif. 90000 USA
Home Phone Number: 408-555-0000

Completing this form is completely optional to the user except the user name, but these are the answers to the questions which are asked by a typical 911 operator, a very time-consuming and difficult to answer task in a real emergency situation. So this information is already in the non-volatile memory of the smart phone and ready to be sent with current information automatically attached to it in the case of a personal emergency. The optional personal information is entered earlier by filling out the blanks in the "Personal Information" data entry form in the user interface and takes only few minutes.

Current information is automatically added to the "Emergency SMS text", by the smart phone including the cell phone number, GPS coordinates and altitude and optional additional information if the user is in a state to enter current specific information about a situation. This optional information is entered through the feree-form "Notes" field before sending the "Emergency SMS" message.

This "Emergency SMS" message will be sent to the emergency dispatch number as well as any number of phone numbers that the user provides as an "Emergency Contacts" list when activated. This list must be generated by the user.

One effective way of catching the attention of the emergency contact person when an "Emergency SMS" is received is by generating "Emergency SMS tune". The smart phone application routines which are provided to the developers do not support reading the incoming SMS messages for security reasons. There are ways around it, but using them will not make the developer very popular among the smart phone manufacturers!

The receiving unit may display first several lines of the received SMS messages as default. Using this standard feature of SMS, display action is utilized to warn the party of an emergency situation by having the first two lines of the "Emergency SMS Text" as
!!! SolarTimer—Emergency from Osman Ersed Akcasu!!!
Emergency Type: Earthquake
This will appear in the standard SMS in the smart phone as:
Ersed or (408-555-0000)
!!! SolarTimer—Emergency from Osman Ersed Akcasu!!!
Emergency Type Earthquake This is a silent way of capturing the attention of the emergency contact person, as well as the dispatcher without reading the full text. The following is an example of a full-text emergency message:
!!!SolarTimer—Emergency from Osman Ersed Akcasu !!!
Emergency Type Earthquake
Notes:
GPS Coordinates 40.97065° N, 28.79717° E, 63 m
Date and Time of Last GPS Access: 01/12/2011 11:39:09
Current Date and Time:
02/12/2012 06:39:57
GPS Status: Not Operational (1140.8 Min)
Battery Status: %45
Calling Cell Phone Number: 408-555-0000
Name: Osman Ersed Akcasu
Gender: Male
Age: 56
Blood Group: 0RH+
Weight: 163 lb/74 kg
Height: 1.72 m, 5 feet 3 inches
Home Phone Number: 408-555-0000
Address: 155 East Main Avenue, Mytown, Calif. 90000, USA
Special Health Conditions: Diabetic and on High Blood Pressure medication
Daily Prescriptions Glucophage XR 1,000 mg, two times a day
Doctor Contact Dr. Smith 408-555-1212
Status: Already contacted the Emergency Contacts with Emergency SMS
Language: English The underlying smart phone application, called SolarTimer, supports 39 languages at the time of this disclosure. Having the last line of information as the language of the "Emergency SMS" simplifies the automatic translation of the "Emergency SMS" information which was sent. The "Emergency SMS" which was received by the emergency contact numbers with different language settings of SolarTimer allows it be automatically translated to the set SolarTimer language setting in the receiving parties. This feature is very useful when the SolarTimer user travels to a different country with a different language and faces an emergency situation. SolarTimer will automatically translate the received "Emergency SMS" into the current language setting of the SolarTimer navigation application. Similar automatically translation can be done in the "Emergency Response Service" as well for the tourists facing an emergency situation during their travel.

The only optional information is that entered by the user in restricted data entry fields, herein indicated by italics, and location coordinates supplied by a GPS element associated with the application.

One of the great reliefs to the person in emergency is confirmation of the receipt of the "Emergency SMS" by the "Emergency SMS Response Service" with an automatic "personal" SMS reply. After the "Emergency SMS" is received the "Emergency SMS Response Service" will automatically respond with a confirmation SMS indicating that it was received and being processed. For example, an automatic SMS reply may be:

"Osman Ersed Akcasu your emergency SMS is received, response units are taking necessary action. An operator will call shortly. There are 150,201 emergency SMS's received in a mile radius of your GPS Coordinates 40.97065° N, 28.79717° E in the last hour. We will update you with the response progress every 10 minutes either with a call or through an SMS". All your "emergency contacts" have received your "Emergency SMS". Note: Do not waste your valuable cell phone battery which is at 45% capacity by making unnecessary calls. Help is on the way. Be calm! To save battery power you can turn off the GPS capability of your cell phone, we have your coordinates!"

The number of "Emergency SMS's" received in a given distance from the sender will give the magnitude of the disaster to the person in emergency! If there is no confirmation from the "Emergency SMS Response Service" it is typically not good news for the person in the emergency. This means either "Emergency SMS Response Service" itself is out of action or the cell phone service network is not functional. The importance of having an operational cell phone network in a large area disaster becomes quite obvious.

The cellular network providers, FEMA (Federal Emergency Management Agency) or both in coordination need to be prepared for the logistics for setting up mobile base station units for quickly restoring a disrupted the cell phone network. This can be prepared as trucks with erectable cell phone base stations with portable generators and communication capability with radio or satellite data links. In addition to these truck-mounted "mobile cell phone base station" units, modular helicopter transportable versions are suggested and ought to be provided. Having these "modular helicopter transportable mobile cell phone base stations" is a mechanism for quickly resuming the cell phone service in case of major disaster where ground transportation to the pre-planned emergency cell phone base station locations is not possible.

Currently the technology exists for setting up a cell phone network in a large urban area entirely based on mobile systems as quickly as the "mobile cell phone base station" units can reach their already planned locations. In addition to building a number of "mobile cell phone base station" units, planning and installation crews have to be trained and drilled which is the key for quickly resuming the cell phone service in case of major disaster.

The invention has now been explained with reference to specific embodiments. Other embodiments will be evident to those of skill in the art upon reference to this disclosure. It is therefore not intended that this invention be limited, except as indicated by the appended claims.

What is claimed is:

1. A method comprising:
   providing a smart phone with SMS capability and location identification capability;
   providing a first form for entering personal information in a preprogrammed SMS message format;
   providing a second form for entering current situational information associated with an emergency in the preprogrammed SMS message format in the smart phone;
   providing to the smart phone a preprogrammed emergency SMS calling number for an emergency dispatcher; thereafter
   upon occurrence of an occasion to summon aid, causing the preprogrammed emergency SMS calling number to be called from the smart phone of a sender;
   upon connecting with the emergency SMS calling number, causing the smart phone to automatically send contents of the first form and of the second form to the preprogrammed emergency SMS calling number together with information indicative of current location of the smart phone;
   parsing the first form and the second form into a data set; and thereafter
   prompting the recipient of the data set to formulate a response plan to the data set, the data set including information about positioning of the sun and the moon relative to the location of sender, to cause at least one response through the recipients in accordance with the response plan.

2. The method of claim 1 wherein the location information is at least partially derived from GPS signals.

3. The method of claim 1 further including:
   prior to calling, providing to the smart phone a preprogrammed list of emergency contact SMS calling numbers; thereafter
   upon the occurrence of the occasion to summon aid, causing the smart phone to call the preprogrammed list; and upon each connection to the emergency contact SMS calling numbers,
   causing the smart phone to communicate at least contents of said first form and said of second form to the connection.

4. The method of claim 3 further including:
   upon connecting with the emergency SMS calling number, receiving at the smart phone prompt acknowledgement of establishment of the connection.

5. The method of claim 4 further including:
   receiving at the smart phone a report on expected actions in accordance with the response plan.

6. A method comprising:
   providing capability at a response location to receive an SMS message and location information from a smart phone via a preprogrammed emergency SMS calling number associated with an emergency dispatcher;
   providing capability to receive data of a first form containing personal information in a first preprogrammed SMS message format;
   providing capability to receive data of a second form containing current situational information associated with an emergency in a second preprogrammed SMS message format; thereafter, in response to a call to the preprogrammed emergency SMS calling number,
   receiving from the smart phone contents of the first form and of the second form together with information indicative of current location of the smart phone;
   prior to calling, providing to the smart phone a preprogrammed list of emergency contact SMS calling numbers; thereafter
   upon the occurrence of the occasion to summon aid, causing the smart phone to call the preprogrammed list; and upon each connection to the emergency contact SMS calling numbers,
   causing the smart phone to communicate at least contents of said first form and said of second form to the connection.

7. The method of claim 6 wherein the location information is at least partially derived from GPS signals.

8. The method of claim 6 further including:
   parsing the first form and the second form into a data set;
   determining location of the smart phone;
   determining position of the sun and the moon relative to the location of the smart phone; and thereafter
   prompting each recipient of the data set to execute a response plan to the data set to cause at least one response in accordance with the response plan.

9. The method of claim 8 further including:
   upon connecting with the emergency SMS calling number, promptly transmitting to the smart phone acknowledgement of establishment of the connection.

10. The method of claim 9 further including:
    transmitting to the smart phone a report on expected actions in accordance with the response plan.

11. The method of claim 6 further including:
    parsing the first form and the second form into a data set; and thereafter formulating a response plan to the data set to cause at least one response in accordance with the response plan.

* * * * *